(12) United States Patent
Wyne

(10) Patent No.: US 12,671,455 B2
(45) Date of Patent: Jun. 30, 2026

(54) REMOVABLE MOBILE DEVICE HAND STABILIZER

(71) Applicant: COMBINED MANUFACTURING, INC, Wildwood, MO (US)

(72) Inventor: Mark W. Wyne, Wildwood, MO (US)

(73) Assignee: COMBINED MANUFACTURING, INC, Wildwood, MO (US)

( * ) Notice: Subject to any disclaimer, the term of this patent is extended or adjusted under 35 U.S.C. 154(b) by 291 days.

(21) Appl. No.: 18/501,387

(22) Filed: Nov. 3, 2023

(65) Prior Publication Data
US 2025/0150109 A1 May 8, 2025

(51) Int. Cl.
*H04M 1/02* (2006.01)
*H04B 1/3827* (2015.01)
*H04B 1/3888* (2015.01)
*H04M 1/04* (2006.01)

(52) U.S. Cl.
CPC ............ *H04B 1/3888* (2013.01); *H04M 1/04* (2013.01)

(58) Field of Classification Search
None
See application file for complete search history.

(56) References Cited

U.S. PATENT DOCUMENTS

| | | | |
|---|---|---|---|
| 10,627,046 B1 * | 4/2020 | Jang ....................... | G06F 1/1635 |
| 10,785,358 B1 * | 9/2020 | Packes .................. | G06F 1/1626 |
| 2017/0230488 A1 * | 8/2017 | Palacino .......... | H04M 1/72409 |
| 2018/0069580 A1 * | 3/2018 | Harris-Johnson ...... | H04B 1/385 |
| 2019/0181904 A1 * | 6/2019 | Sturniolo ............. | H04B 1/3888 |
| 2022/0094379 A1 * | 3/2022 | Balderston ............ | A45F 5/1516 |

FOREIGN PATENT DOCUMENTS

| | | | | | |
|---|---|---|---|---|---|
| CN | 116368738 A | * | 6/2023 | ........... | A45F 5/1516 |
| EP | 3825812 A1 | * | 5/2021 | ........... | A45F 5/1516 |
| JP | 3157380 U | * | 2/2010 | | |
| KR | 20080096244 A | * | 10/2008 | ........... | H04B 1/3888 |

* cited by examiner

*Primary Examiner* — Mohammed Rachedine
(74) *Attorney, Agent, or Firm* — Sandberg Phoenix & von Gontard P.C.

(57) ABSTRACT

A removable mobile device hand stabilizer permits a user to more securely grip their mobile device without substantially altering the form factor of the mobile device. The grip can be held by the user's finger or can hold the user's finger and thereby help to stabilize the mobile device, particularly during one-handed use.

20 Claims, 3 Drawing Sheets

REMOVABLE MOBILE DEVICE HAND STABILIZER

CROSS-REFERENCE TO RELATED APPLICATIONS

Not applicable.

FIELD

The present teachings relate to hand grips and stabilizers for mobile devices such as cell phones, electronic tablets and e-readers.

BACKGROUND

The statements in this section merely provide background information related to the present disclosure and cannot constitute prior art.

The form factor of mobile devices has come to increasingly favor wide, thin bodies with large touchscreens that occupy nearly the entire area of the primary surface. Such form factors have obvious benefits. Because they are thin, smooth, and generally rectangular, such mobile devices easily and unobtrusively fit into pants pockets, purses, briefcases, tote bags, and other similar carrying implements. Many people are also drawn to the aesthetic of such devices.

However, the reduction and even elimination of physical keyboards, buttons, scroll wheels, and other non-touch-screen elements from mobile devices' primary surface has resulted in mobile devices being more difficult to hold and use, particularly with a single hand. Skilled users are able to hold most mobile devices in one hand and interact with the screen using that same hand's thumb, but doing so reliably can be unduly challenging, and it is easy for the phone to angle away or slip out of the user's hand.

A number of implements have been engineered and sold for improving a user's grip on such mobile devices, particularly when using one hand. The most popular of these so far is a substantially conical implement that adheres to the rear surface of the mobile device. While this can offer a means of gripping the mobile device, it does so at the cost of the mobile device's form factor, which is now too bulky to comfortably and unobtrusively fit into small conveyances such as a pants pocket. Thus, there is need for a technological solution that enables easier gripping of a mobile device without ruining the substantially flat form factor of most modern mobile devices.

BRIEF SUMMARY

In various embodiments, presented herein is removable mobile device hand stabilizer. The hand stabilizer comprises an insert portion sized to be received and held by a port of the mobile device. The insert portion is attached to a grip portion. The grip portion can be held by a user's finger in order to help stabilize the device, particularly during one-handed use, or it can be so shaped as to receive and hold the user's finger.

In various embodiments, the removable device hand stabilizer does not convey electrical current or data to or from the mobile device, and can easily be inserted or removed from one or more ports on the mobile device.

BRIEF DESCRIPTION OF THE DRAWINGS

In FIG. 3A, the hand stabilizer comprises a protrusion gripped by a finger. In FIG. 3B, the hand stabilizer comprises a ring through which a finger is inserted.

Corresponding reference numerals will be used throughout the several figures of the drawings.

DETAILED DESCRIPTION

Figures 1A, 1B:
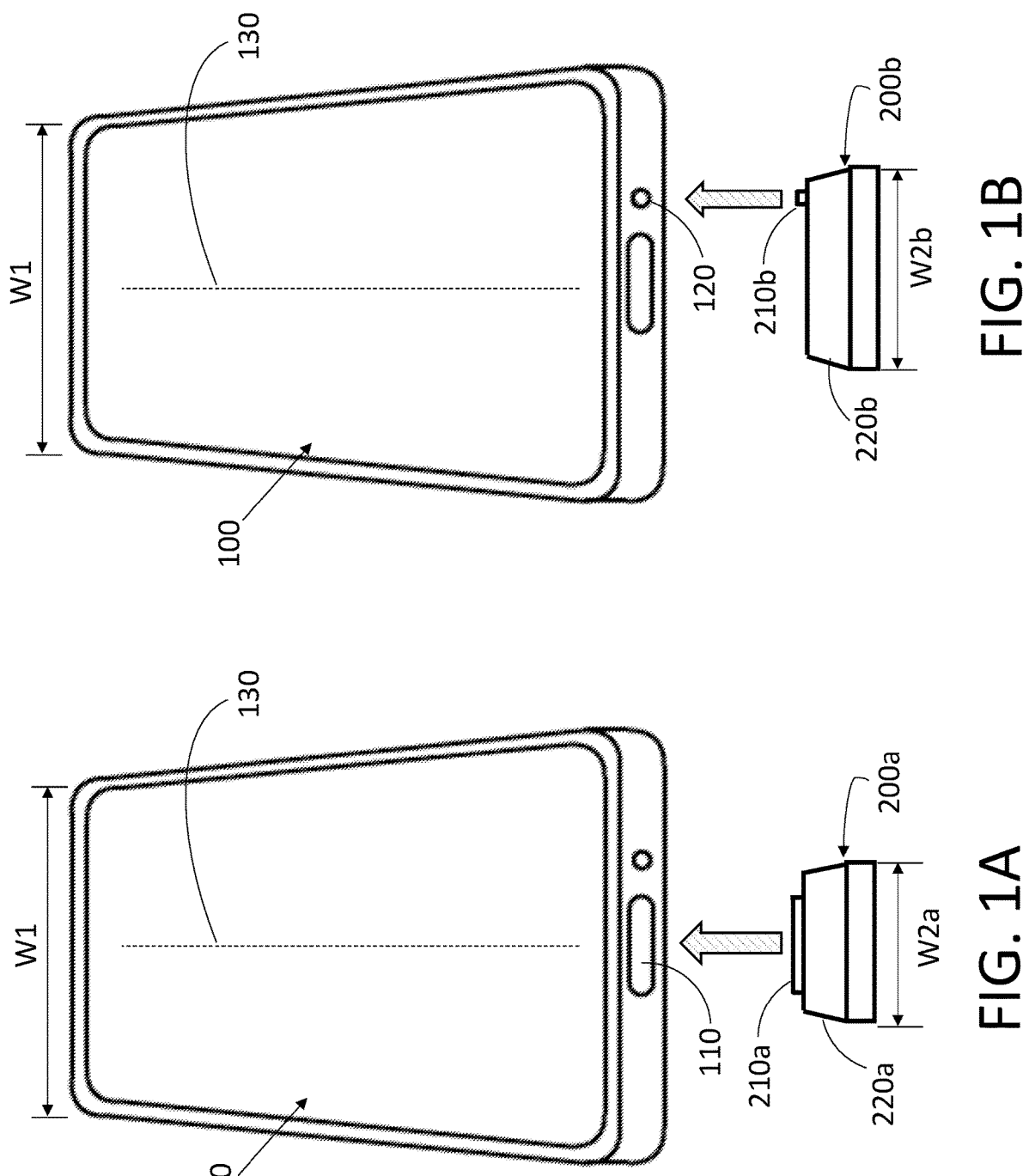
FIG. 1A shows isometric view of an exemplary embodiment of a mobile device in accordance with the present disclosure, wherein a hand stabilizer attaches to a charging port of the mobile device.
FIG. 1B shows an isometric view of an alternative exemplary embodiment of a mobile device in accordance with the present disclosure, wherein a hand stabilizer attaches to an auxiliary port of the mobile device.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what we presently believe is the best mode of carrying out the claimed invention. Additionally, it is to be understood that the claimed invention is not limited in its applications to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

The removable mobile device hand stabilizer disclosed within comprises, in various exemplary embodiments, comprises a grip portion sized and disposed to interface with a user's finger and thereby stabilize the user's grip on a mobile device as well as an insert portion sized and disposed to interface with a port of a mobile device.

Referring to FIG. 1A, in at least one embodiment, a removable mobile device hand stabilizer 200a comprises a grip portion 220a that is operably connected to an insert portion 210a. The grip portion 220a is sized and disposed to be gripped by a user's finger, such as a pinky, thereby aiding the user in stably grasping the mobile device. The grip portion 220a has a width W2a that is smaller than a width W1 of the mobile device 100. The insert portion 210a is sized and disposed to be received and held by a charging port 110 of a mobile device 100. The charging port 110 may be a USB port, micro-USB port, a proprietary charging and data transfer port, or any other charging port or wired data transfer port known to one of ordinary skill in the art. The charging port 110 is substantially symmetric with respect to a central axis 130 of the mobile device 100.

In an alternative embodiment as shown in FIG. 1B, a removable mobile device hand stabilizer 200b comprises a grip portion 220b that is operably connected to an insert portion 210b. The insert portion 210b is sized and disposed to be received and held by an auxiliary port 120 of a mobile device 100. The auxiliary port 120 may be a USB port, a 3.5 mm audio jack, a SIM card slot, a MicroSD slot, pogo pins, an HDMI port, or any other port known to one of ordinary skill to be able to be located on a mobile device. If the auxiliary port 120 is not located so as to be substantially symmetric with respect to the central axis 130 of the mobile device 100, as in FIG. 1B, then the grip portion 220b may accommodate the placement of the auxiliary port by being elongated so as to enable the grip portion to be substantially symmetric with respect to the central axis. The grip portion 220*b* has a width W2*b* that does not exceed the width W1 of the mobile device 100 even when the grip portion is elongated to accommodate the placement of the auxiliary port 120.

Figures 2A, 2B, 2C, 2D:
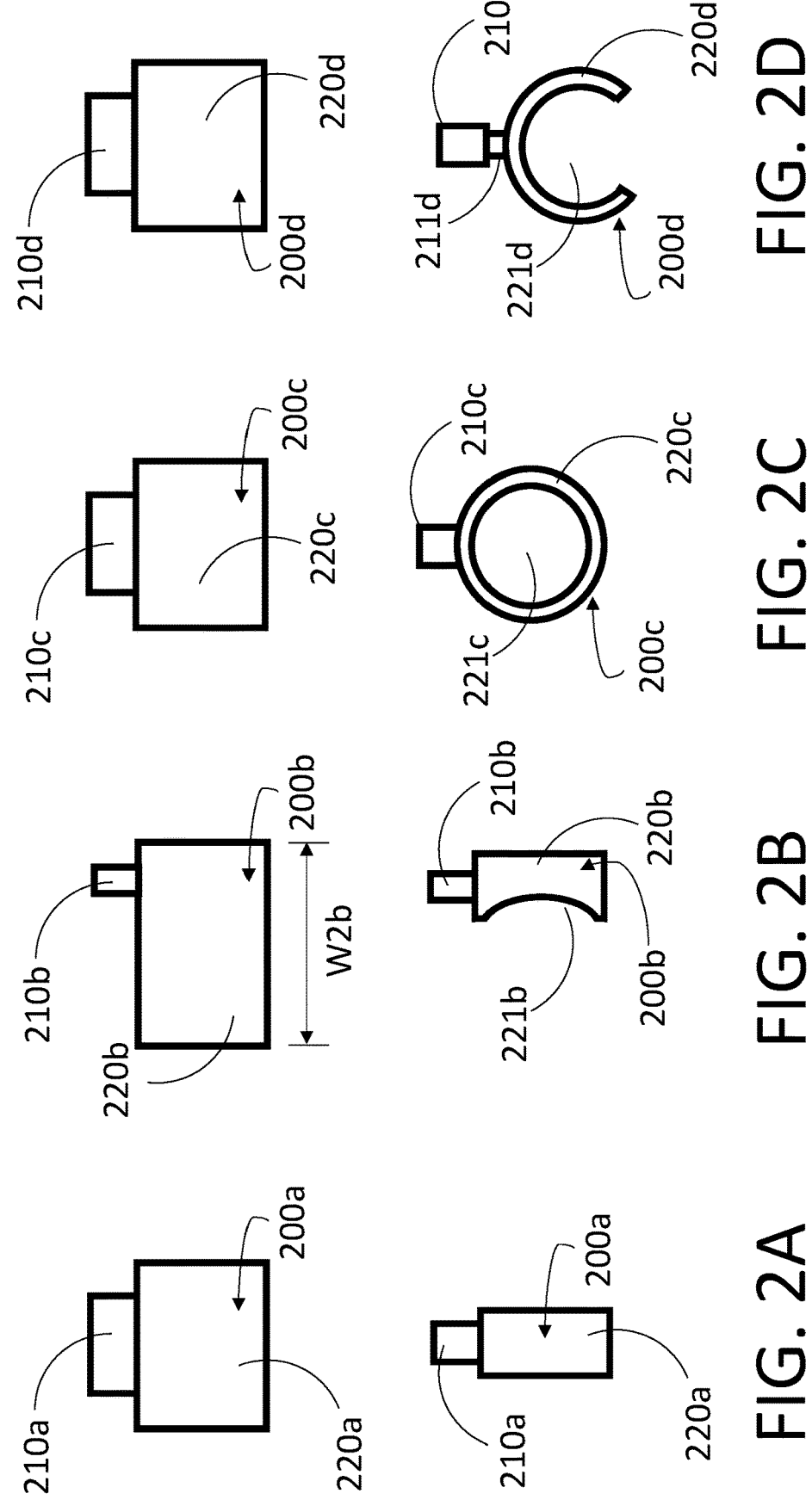
FIGS. 2A-2D show front and profile views of various exemplary embodiments of the hand stabilizer of the present disclosure.

Turning to FIGS. 2A-2D, multiple different embodiments of a removable mobile device hand stabilizer are shown. These embodiments are exemplary and not intended to be limiting, and are shown in front view (top) and in profile (bottom). FIG. 2A shows removable mobile device hand stabilizer 200*a* comprising an insert portion 210*a* and grip portion 220*a*, as discussed in the context of FIG. 1A. The hand stabilizer 200*b* shown in FIG. 2A is distinct from the embodiment 200*a* shown in FIG. 2A in two ways. First, as discussed in the context of FIG. 1B, the hand stabilizer 200*b* can have an elongated width W2*b* to accommodate a location of the auxiliary port 120 of the mobile device 100. Second, as shown in the bottom profile view of FIG. 2B, the hand stabilizer 200*b* can comprise a concave recession 221*b* shaped to better receive a user's finger.

FIG. 2C shows an exemplary embodiment of a hand stabilizer 200*c* that comprises an insert portion 210*c* and a grip portion 220*c* that is substantially a hollow cylinder featuring a concentric hole 221*c*. The hole 221*c* is appropriately sized to receive and hold a user's finger.

FIG. 2D shows an exemplary embodiment of a hand stabilizer 200*d* that comprises an insert portion 210*d* that is connected to one end of a pivot portion 211*d*. The pivot portion 211*d* is then connected to a grip portion 220*d*, which has a substantially arcuate profile. The pivot portion 211*d* is capable of rotating at the point of its attachment to the insert portion 210*d*, thereby enabling the grip portion 220*d* to pivot with respect to the insert portion. The arcuate profile of the grip portion 220*d*, which defines a hole region 221*d*, enables the grip portion to receive and hold a user's finger. The grip portion 220*d* is, in various exemplary embodiments, made of a semi-rigid flexible material so that it can stretch and bend to comfortably accommodate a wide range of user finger sizes.

Figures 3A, 3B:
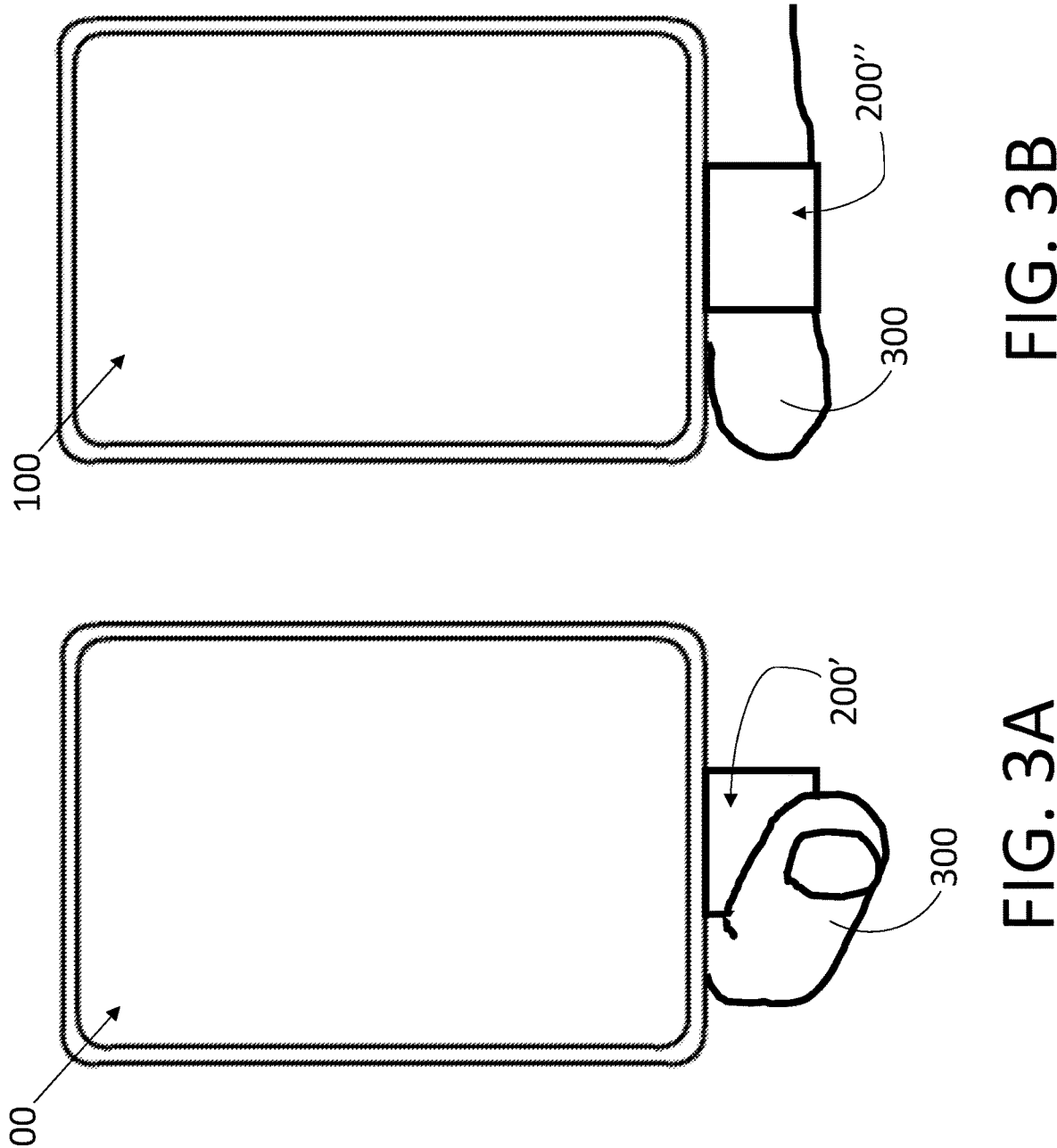
FIGS. 3A and 3B are top-down views of various exemplary embodiments of a cell phone with an attached hand stabilizer.

Turning to FIG. 3A, in various exemplary embodiments, a removable mobile device hand stabilizer 200' is received and held by mobile device 100 by insertion into either the charging port or an auxiliary port as described above. A user's finger 300, such as a pinky, curls around the hand stabilizer 200' in order to enhance and stabilize the user's grip on the mobile device 100. The hand stabilizer 200' can comprise features as described by the exemplary embodiments shown in FIGS. 2A through 2D, and can comprise any sufficiently rigid or flexible material to support its operation while meeting the preferences of the user, such as plastic or rubber.

In the alternative exemplary embodiment depicted in FIG. 3B, the hand stabilizer 200" can comprise features as described by the exemplary embodiments shown in FIGS. 2A through 2D, and especially the hollow grip portion 220*c* and arcuate grip portion 220*d*, thereby permitting a user's finger 300 to be received and held by the grip portion 200". In either of the exemplary embodiments shown in FIGS. 3A and 3B, the hand stabilizers 200' and 200" are held and received by either the charging port 110 or auxiliary port 120, but can easily be detached for convenience.

As various changes could be made in the above constructions without departing from the scope of the invention, it is intended that all matter contained in the above description or shown in the accompanying drawings shall be interpreted as illustrative and not in a limiting sense.

What is claimed is:

1. A removable mobile device hand stabilizer, comprising:
an insert portion sized and disposed to be received and held by a port on a mobile device with the insert portion positioned symmetric with a central axis of the port and of the mobile device, and;
a grip portion affixed to the insert portion that is sized and disposed to interface with a finger of a user and is positioned symmetric with the central axis of the port and of the mobile device.

2. The hand stabilizer of claim 1, wherein the port on the mobile device is a charging port.

3. The hand stabilizer of claim 1, wherein the port on the mobile device is an auxiliary port.

4. The hand stabilizer of claim 1, wherein the grip portion is sized and shaped to be held by a user's pinky while the user is holding the mobile device.

5. The hand stabilizer of claim 1, wherein the grip portion is substantially a hollow cylinder sized to receive and hold the finger of a user.

6. The hand stabilizer of claim 1, wherein the grip portion is of an arcuate shape sized to receive and hold the finger of a user.

7. The hand stabilizer of claim 1, wherein the hand stabilizer does not convey current or data to or from the port on the mobile device.

8. A hand stabilizer for a mobile device, the mobile device having a central axis that bisects the mobile device, the mobile device being symmetric with respect to the central axis of the mobile device and the mobile device having a port, the hand stabilizer comprising:
an insert portion that is sized and disposed to be received in the port of the mobile device and held in the port of the mobile device; and
a grip portion fixed to the insert portion with the grip portion being symmetric with the central axis of the mobile device when the insert portion is received in the port of the mobile device and held in the port.

9. The hand stabilizer of claim 8, further comprising:
the grip portion having an arcuate configuration that extends around a hole of the arcuate configuration, the hole being dimensioned to receive a finger of a user of the hand stabilizer in the hole of the arcuate configuration of the grip portion.

10. The hand stabilizer of claim 9, further comprising:
the arcuate configuration of the grip portion being constructed of a flexible material that enables the arcuate configuration to flex around a finger of a user of the hand stabilizer.

11. The hand stabilizer of claim 8, further comprising:
the grip portion having a cylindrical configuration with a concentric hole extending through the cylindrical configuration, the hole being dimensioned to receive a finger of a user of the hand stabilizer in the hole of the cylindrical configuration of the grip portion.

12. The hand stabilizer of claim 11, further comprising:
the concentric hole extending through the cylindrical configuration of the grip portion having a center axis, and the center axis of the concentric hole being perpendicular to the central axis of the mobile device.

13. The hand stabilizer of claim 8, further comprising:
the grip portion having an exterior surface that extends around the central axis of the mobile device, and the exterior surface of the grip portion being configured for engagement with a finger of a user of the hand stabilizer.

14. The hand stabilizer of claim 8, further comprising:

the port is a charging port that is symmetric with respect to the central axis of the mobile device.

15. A hand stabilizer for a mobile device, the mobile device having a central axis that bisects the mobile device, the mobile device being symmetric with respect to a central axis of the mobile device and the mobile device having a charging port that is symmetric with respect to the central axis of the mobile device, the hand stabilizer comprising:

an insert portion that is sized and disposed to be received in the charging port of the mobile device and held in the charging port with the insert portion being symmetric with the central axis of the mobile device; and a grip portion fixed to the insert portion with the grip portion being symmetric with the central axis of the mobile device when the insert portion is received in the charging port of the mobile device and held in the charging port.

16. The hand stabilizer of claim 15, further comprising:

the grip portion having an arcuate configuration that extends around a hole of the arcuate configuration, the hole being dimensioned to receive a finger of a user of the hand stabilizer in the hole of the arcuate configuration of the grip portion.

17. The hand stabilizer of claim 16, further comprising:

the arcuate configuration of the grip portion being constructed of a flexible material that enables the arcuate configuration to flex around a finger of a user of the hand stabilizer.

18. The hand stabilizer of claim 15, further comprising:

the grip portion having a cylindrical configuration with a concentric hole extending through the cylindrical configuration, the hole being dimensioned to receive a finger of a user of the hand stabilizer in the hole of the cylindrical configuration of the grip portion.

19. The hand stabilizer of claim 18, further comprising:

the concentric hole extending through the cylindrical configuration of the grip portion having a center axis, and the center axis of the concentric hole being perpendicular to the central axis of the mobile device.

20. The hand stabilizer of claim 15, further comprising:

the grip portion having an exterior surface that extends around the central axis of the mobile device, and the exterior surface of the grip portion being configured for engagement with a finger of a user of the hand stabilizer.

* * * * *